(12) United States Patent
Dorenkamp et al.

(10) Patent No.: US 8,751,134 B2
(45) Date of Patent: Jun. 10, 2014

(54) METHOD AND DEVICE FOR REGULATING THE SPEED OF A MOTOR VEHICLE

(75) Inventors: Stephan Dorenkamp, Ludwigsburg (DE); Thomas Gruber, Rutesheim (DE); Werner Urban, Vaihinnngen/Enz (DE); Juergen Boecker, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 976 days.

(21) Appl. No.: 12/308,531

(22) PCT Filed: Oct. 1, 2007

(86) PCT No.: PCT/EP2007/060388
§ 371 (c)(1),
(2), (4) Date: Aug. 11, 2010

(87) PCT Pub. No.: WO2008/058809
PCT Pub. Date: May 22, 2008

(65) Prior Publication Data
US 2010/0299043 A1    Nov. 25, 2010

(30) Foreign Application Priority Data
Nov. 15, 2006  (DE) .......................... 10 2006 054 220

(51) Int. Cl.
*G05D 1/00* (2006.01)
(52) U.S. Cl.
USPC ................................. 701/96; 701/93; 701/300
(58) Field of Classification Search
USPC ................................. 701/300, 301, 70, 93, 96
See application file for complete search history.

(56) References Cited

U.S. PATENT DOCUMENTS

| | | | |
|---|---|---|---|
| 5,521,579 A * | 5/1996 | Bernhard | 340/438 |
| 5,629,851 A * | 5/1997 | Williams et al. | 701/96 |
| 5,999,874 A | 12/1999 | Winner et al. | |
| 6,653,935 B1 * | 11/2003 | Winner et al. | 340/435 |
| 6,769,504 B2 * | 8/2004 | Kobayashi et al. | 180/169 |
| 6,987,864 B2 * | 1/2006 | Nishigaki et al. | 382/104 |
| 7,373,237 B2 * | 5/2008 | Wagner et al. | 701/96 |
| 7,801,659 B2 * | 9/2010 | Leineweber et al. | 701/96 |
| 2005/0209764 A1 * | 9/2005 | Schroder | 701/93 |
| 2005/0278098 A1 * | 12/2005 | Breed | 701/45 |

FOREIGN PATENT DOCUMENTS

| | | |
|---|---|---|
| DE | 19 637 245 | 3/1998 |
| DE | 196 37 245 | 3/1998 |
| DE | 103 08 256 | 9/2004 |
| EP | 1 486 370 | 12/2004 |
| JP | 10-95246 | 4/1998 |
| JP | 2003-25868 | 1/2003 |

* cited by examiner

*Primary Examiner* — Ernesto Suarez
(74) *Attorney, Agent, or Firm* — Kenyon & Kenyon LLP

(57) ABSTRACT

For regulating the speed of a motor vehicle, a control apparatus is equipped with an object detection system, and the reference speed is determined as a function of at least one preceding vehicle in the evaluation region of the object detection system, such that upon recognition of an imminent lane change by the regulated vehicle, vehicles in the adjacent destination lane are additionally taken into consideration for calculation of the reference speed by expanding the evaluation region in the direction of the destination lane, and consideration is given only to vehicles in the destination lane whose distance from the regulated vehicle is less than a predetermined distance value.

15 Claims, 5 Drawing Sheets

METHOD AND DEVICE FOR REGULATING THE SPEED OF A MOTOR VEHICLE

BACKGROUND OF THE INVENTION

1. Field of the Invention

The present invention relates to a method and an apparatus for regulating the speed of a motor vehicle, the apparatus being equipped with an object detection system, and in which the reference speed is determined as a function of at least one preceding vehicle in the evaluation region of the object detection system.

2. Description of Related Art

Published German patent document DE 196 37 245 discloses a method and an apparatus for regulating the speed of a vehicle in consideration of preceding vehicles. In order to select a preceding vehicle as a regulation target, a future driving path profile is determined. In the context of an intended and/or incipient lane change by the regulated vehicle, the determined future driving path is widened.

As a result, in the context of an intended lane change, vehicles in the lane alongside are also taken into consideration; incorrect reactions by the speed regulator often occur because consideration is given to vehicles in the adjacent lane that, however, result in incorrect reactions because of their great distance from the regulated vehicle, which reactions are not comprehensible to, and therefore inconvenient for, the driver.

BRIEF SUMMARY OF THE INVENTION

The present invention relates to a method and an apparatus for regulating the speed of a motor vehicle, the apparatus being equipped with an object detection system, and in which the reference speed is determined as a function of at least one preceding vehicle in the evaluation region of the object detection system, such that upon recognition of an imminent lane change by the regulated vehicle, vehicles in the adjacent destination lane are additionally taken into consideration for calculation of the reference speed by expanding the evaluation region in the direction of the destination lane, and consideration being given only to vehicles in the destination lane whose distance from the regulated vehicle is less than a predetermined distance value. Provision can additionally be made that the evaluation region on the side opposite the destination lane is reduced during the lane change.

What is meant in the context of the present invention by the term "destination lane" is the adjacent lane into which the regulated vehicle would like to change by way of a lane change action. In the context of the disclosure of the present invention, an explanation has been given here, by way of example, of a lane change of a vehicle from a center lane M to a right lane R of a three-lane road. This disclosure is, however, explained only by way of example. What is of course meant in the context of the invention is any lane change from an arbitrary lane to another arbitrary lane adjacent on the left or right side, the indications "left," "right," and "center" to be correspondingly modified here as applicable.

The essence of the present invention is to describe a method and an apparatus such that only those vehicles in the adjacent lane that are relevant to the planned lane change are sensed.

For this purpose, advantageously, upon recognition of a lane change intention, the evaluation region of the object detection sensor is expanded beyond the own lane toward the destination lane, although only those vehicles in the adjacent lane whose distance is below a certain distance value are taken into consideration. As a result, vehicles far away in the adjacent destination lane are not considered, so that erroneous and undesired controller behavior can be avoided.

Advantageously, the evaluation region is dimensioned substantially so that it senses the lane currently being traveled in.

It is additionally advantageous that the predetermined distance value is a predefined value, with the result that the function is easily implemented and the controller behavior with respect to distance is always comprehensible, or else the predetermined distance value is a modifiable value, with the result that the controller behavior can be adapted to the particular contextual situation in each lane change situation, and the method becomes particularly convenient as a result of this adaptiveness. For example, the predetermined modifiable distance value can be accomplished as a function of the speed of the own (regulated) vehicle, or else can be configured as a function of the relative speed of the detected vehicle in the destination vehicle lane with respect to the regulated own vehicle.

It is additionally advantageous that the evaluation region is reduced, during the lane change, on the side opposite the destination lane. The influence of vehicles that are located in the adjacent lane opposite the destination lane is thereby reduced; this can be relevant in particular when the vehicle in the adjacent lane that is opposite the destination lane wishes to change to what is at present the own lane. In addition, preceding vehicles in the own lane are given less-dominant consideration because a portion of the own lane is no longer covered by the reduced evaluation region, with the result that the controller behavior is determined even more by vehicles in the destination lane, and the driving behavior of a human driver is even more strongly simulated. It is particularly advantageous in this context that the reduction of the evaluation region on the side opposite the destination lane occurs only within the distance region within which the evaluation region on the destination-lane side is expanded.

It is additionally advantageous that recognition of an imminent lane change by the regulated vehicle is accomplished by evaluation of a lane change recognition device. The lane change recognition device can be, for example, coupled to the directional indicator, so that when the driver actuates the turn-signal lever and the directional indicator is activated, the system according to the present invention registers an imminent lane change. It is additionally possible to recognize the imminent lane change intention by way of a yaw rate signal, by ascertaining the rotation angle of the vehicle about its vertical axis and recognizing, from the time derivative of said rotation angle, that the own vehicle is moving toward a adjacent lane. Systems of this kind are already present in most modern vehicles by way of vehicle-dynamics control systems, so that this reliable signal is usable in particularly advantageous fashion. A further possibility for recognizing an imminent lane change consists in evaluating a steering wheel angle signal, a rotation angle sensor being installed, for example, in the steering column of the steering wheel and detecting a motion of the steering wheel that can result in a lane change.

It is additionally advantageous that the expansion of the evaluation region on the destination-lane side and/or the reduction of the evaluation region on the side opposite the destination-lane side are canceled after a predetermined time period has elapsed, the time period usually being dimensioned such that an average lane change can be carried out in that time. Alternatively, it is advantageous that the expansion of the evaluation region on the destination-lane side and/or the reduction of the evaluation region on the side opposite the destination-lane side are canceled when the end of the lane change operation by the regulated vehicle is recognized by evaluation of the lane change signal of a lane change recognition means. Once again, the directional indicator, a yaw rate sensor, and/or a steering wheel angle sensor are advantageously provided as a lane change recognition means.

Implementation of the method according to the present invention in the form of a control element that is provided for a control unit of an adaptive separation and speed control system of a motor vehicle is of particular importance. A program that is executable on a computing device, in particular on a microprocessor or signal processor, and is suitable for carrying out the method according to the present invention, is stored in the control element. In this case the invention is therefore implemented by a program stored on the control element, so that said control element equipped with the program represents the invention in the same way as the method for whose performance the program is suitable. An electrical storage medium, for example a read-only memory, can be used in particular as a control element.

Further features, possible applications, and advantages of the invention are evident from the description below of exemplifying embodiments of the invention which are depicted in the Figures of the drawings. All features described or depicted, individually or in any combination, constitute the subject matter of the invention, regardless of their grouping in the Claims or their internal references, and regardless of their formulation or depiction in the description and the drawings, respectively.

DETAILED DESCRIPTION OF THE INVENTION

Figure 1:
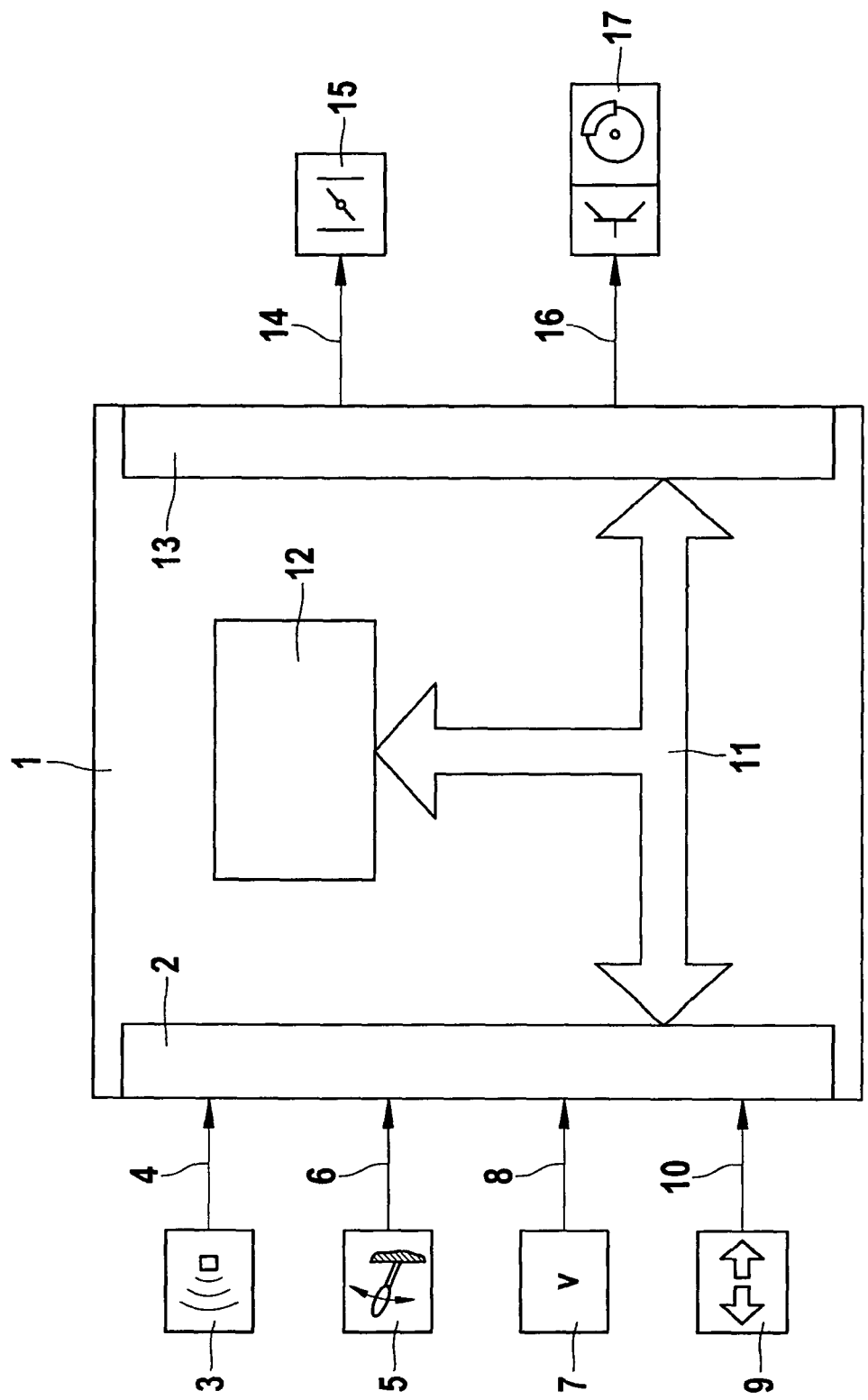
FIG. 1 is a schematic block diagram of an embodiment of the apparatus according to the present invention.

FIG. 1 shows an adaptive separation controller 1 that possesses an input circuit 2 by way of which input signals 4, 6, 8, 10 are deliverable to adaptive separation controller 1. The input signals 4 provided are signals of an object detection sensor 3 that can be configured, for example, as a lidar sensor, a radar sensor, a video sensor, or an ultrasonic sensor. The configuration as a radar sensor is particularly advantageous, the separation as well as the relative speed and azimuth angle of the detected objects being forwarded in this case from radar sensor 3 to input circuit 2. Also delivered to input circuit 2 are input signals 6 that derive from a driver-actuable operating element. Provided as a driver-actuable operating element 5 is, for example, a steering column lever or buttons on the steering wheel with which the driver can put adaptive separation controller 1 into operation, switch it off, and modify operating parameters of separation controller 1. Also delivered to input circuit 2 of adaptive separation controller 1 is an input signal 8 that derives from a vehicle speed sensor 7. Vehicle speed sensor 7 makes available a signal that represents the speed of regulated vehicle 18 and that is delivered to adaptive separation controller 1 so that the relative speed of the objects recognized by way of object detection sensor 3 can be converted into absolute speeds, and so that speed-dependent functions can be controlled. Also provided is a lane change recognition device 9 with which a lane change signal 10 is outputtable to input circuit 2. Lane change recognition means 9 is embodied, for example, as a directional indicator switch, so that when the driver actuates the turn-signal lever, adaptive separation and speed controller 1 is informed that the driver is planning a lane change. It is additionally possible to embody lane change recognition device 9 as a yaw rate sensor, which measures the rotation angle of the vehicle about its vertical axis and can recognize a lane change based on the derivative over time of the yaw rate angle. Alternatively, a steering wheel angle sensor that can recognize, from the steering wheel actuation, an intention to change lanes, can be provided as a lane change recognition device. This lane change recognition signal 10 can, for example, indicate to adaptive separation controller 1 whether a lane change is intended and, if a lane change is intended, the direction in which it is to be expected and, if applicable, when said lane change operation has been completed.

Input signals 4, 6, 8, 10 delivered to adaptive separation controller 1 by way of input circuit 2 are forwarded by way of a data exchange device 11 to a calculation device 12, where output signals are ascertained from the input signals using the method according to the present invention. The output signals ascertained in calculation device 12 are forwarded via data exchange device 11 to an output circuit 13 that in turn makes output signals 14, 16 available. Output signal 14 is an acceleration signal that is outputted to a power-determining positioning element 15 of an internal combustion engine and can be embodied, for example, as an acceleration request or as a torque request. This acceleration signal is converted by power-determining positioning element 15, which can be embodied e.g. as an electrically controllable throttle valve or as an electrically controllable fuel quantity metering device in the form of a fuel injection valve of a reservoir injection system, into a vehicle acceleration. Also outputted by output circuit 13 is a deceleration signal 16 that is connected to a deceleration device 17 of the vehicle. The deceleration signal is outputted as a deceleration request, as a brake pressure request, or as a braking force request, and is forwarded by a braking force amplifier to the wheel brakes of the vehicle, which in turn convert the deceleration signal into a vehicle deceleration. According to the present invention, in the case in which a planned lane change is recognized by way of lane change recognition device 9, this is reported to adaptive separation controller 1 whereupon, in calculation device 12, the evaluation region of the objects recognized by object detection sensor 3 is modified in such a way that the evaluation region is expanded in the direction of the destination lane. As a result, the controller reaction to vehicles in the adjacent destination lane can already be implemented early on, thereby regulating the vehicle in the context of a lane change without sudden accelerations or decelerations.

Figure 2:
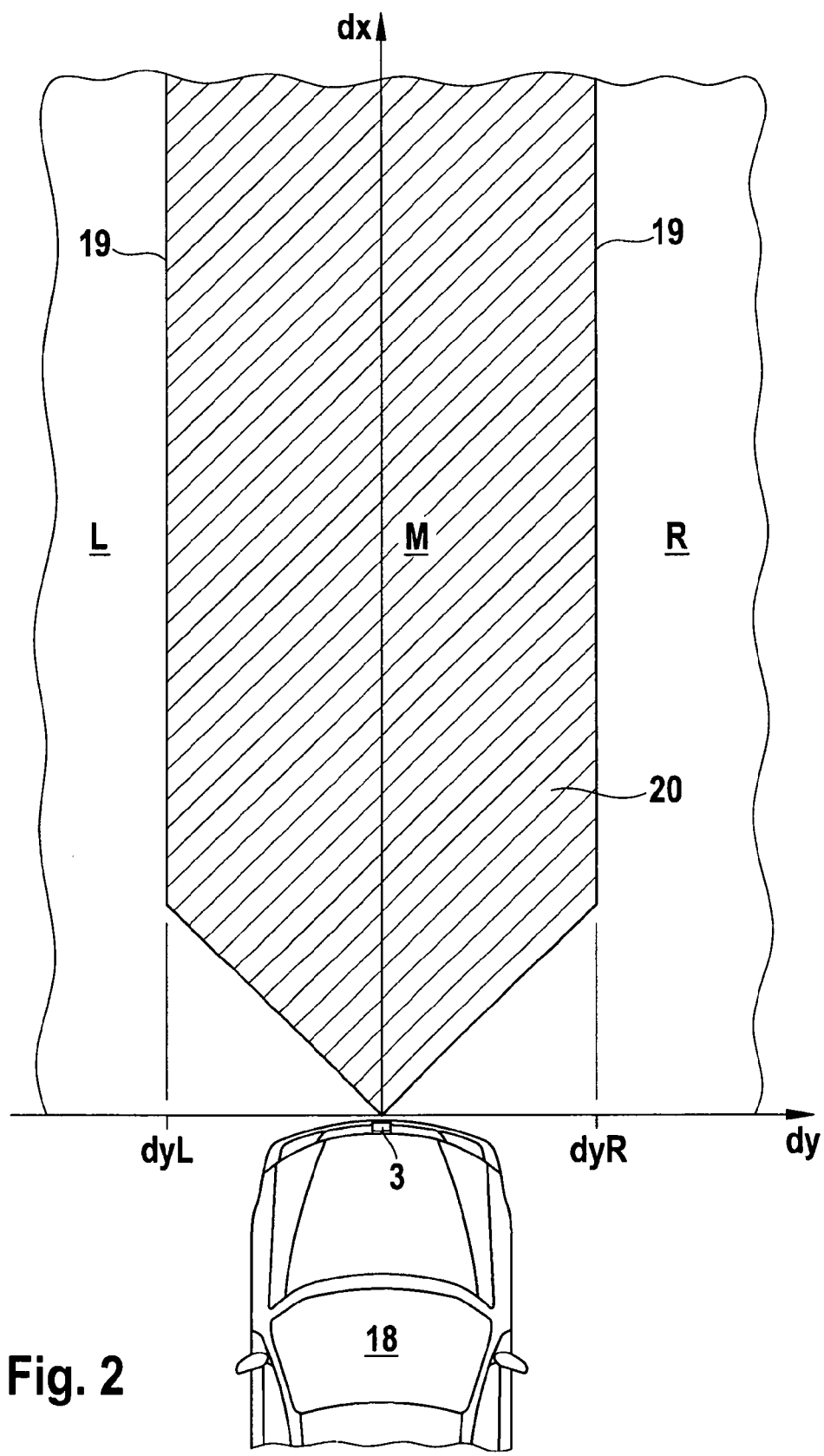
FIG. 2 is a schematic plan view of the detection region of the system according to the present invention.

FIG. 2 schematically depicts the evaluation region of object detection system 3 when driving straight ahead. Regulated vehicle 18, which is equipped at the front of the vehicle with an object detection sensor 3, is visible. In the case in which it is equipped as a radar sensor, object detection sensor 3 can emit microwave radiation and receive the partial radiation reflected from objects within the detection region, and recognize the separation and relative speed of the detected objects. A coordinate system dx, dy is described for this purpose with respect to object detection sensor 3, coordinate axis dx being oriented in the direction of the extended vehicle longitudinal axis, and coordinate axis dy being oriented in the lateral direction with respect to the direction of travel. Provided inside the object detection region is an evaluation region 20 that substantially encompasses the region of the lane presently being traveled in, and thus has a typical width of dyL to dyR, the separation between dyL and dyR typically corresponding to one lane width. This evaluation region 20 is delimited laterally, in the region of the lane delimiters, by lateral evaluation region boundaries 19. The provision of this evaluation region means that only those detected objects that are located within this region are evaluated, but not objects that are located outside evaluation region 20. For example, if regulated vehicle 18 is traveling in center lane M of a three-lane road, then by way of example, only center lane M is evaluated by way of evaluation region 20 with regard to relevant objects. Objects that are located to the left or right of lane M that is presently being traveled in, i.e. objects having lateral offsets of dy<dyL, as well as objects that are located next to evaluation region 20 to the right, i.e. with lateral offsets dy>dyR, are consequently located in the adjacent left lane L or the adjacent right lane R, and are not taken into consideration for determination of the reference speed of regulated vehicle 18. As a result of the provision of this above-described evaluation region 20, objects in adjacent lanes are not evaluated, so that slower objects in neighboring lanes, or stationary objects at the side of the road, have no influence on the reference speed of adaptive separation controller 1.

Figure 3:
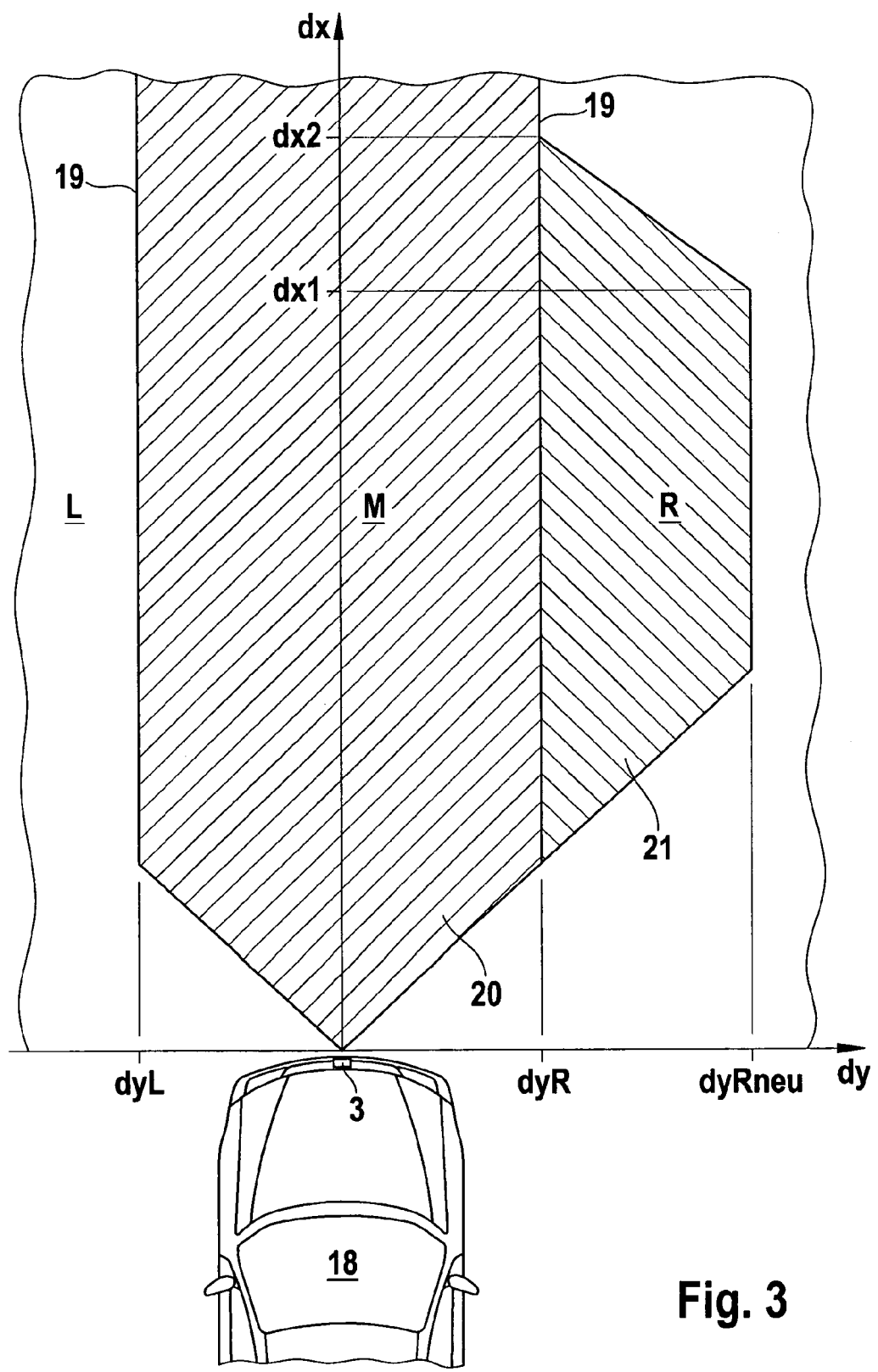
FIG. 3 is a plan view of the detection region of the system according to the present invention, with an expanded evaluation region.

If, when driving with adaptive separation controller 1 activated, an imminent lane change is recognized by lane change recognition device 9, the relevant evaluation region is modified within calculation device 12. For this purpose, as described in FIG. 3, evaluation region 20 is expanded on the side corresponding to the destination lane. In the case of a lane change to the right, the destination lane is the adjacent right lane, and in the case of an intended lane change to the left, the adjacent left lane is the destination lane. In the example depicted, lane change recognition device 9 recognizes a lane change to the right by the fact that, for example, the directional indicator is actuated to the right by the driver, or a corresponding steering wheel motion has been detected, or a corresponding yaw-rate signal has been identified. In this case an expanded evaluation region 21, which evaluates a region in the neighboring lane to the right, is provided on the side of the destination lane, i.e. in the region of lane R. The width of expanded evaluation region 21 is dimensioned so that it likewise typically provides one lane width, so that the right-hand boundary of expanded evaluation region 21 (DY=DYRneu) corresponds to three times half the lane width DYR. According to the present invention, expanded evaluation region 21 is evaluated only out to a certain distance dx, since objects located farther away in the destination lane need not be taken into consideration for regulation at present. Two evaluation region parameters dx1 and dx2 are thus provided, such that expanded evaluation region 21, beginning at dx=dx1, narrows to normal width; and at distance dx2, evaluation region 20 reaches lateral boundaries 19 of evaluation region 20 when driving straight ahead, as described in FIG. 2. Evaluation region parameters dx1 and dx2 can be predefined distance values, but optionally it is also possible to modify these distance values dx1 and dx2 as a function of the present vehicle speed V that is identified by vehicle speed sensor 7, or as a function of the relative speed Vrel that is identifiable by way of object detection sensor 3. For example, at higher speeds V the length of expanded evaluation region 21 can be shifted toward greater distances dx. As a result of expansion 21 (depicted in FIG. 3) of evaluation region 20 in the distance region from dx=0 to distance values dx=dx1 or dx=dx2, consideration is given only to those vehicles in the destination lane that are occupying a distance region relevant for regulation of the reference speed.

Figure 4:
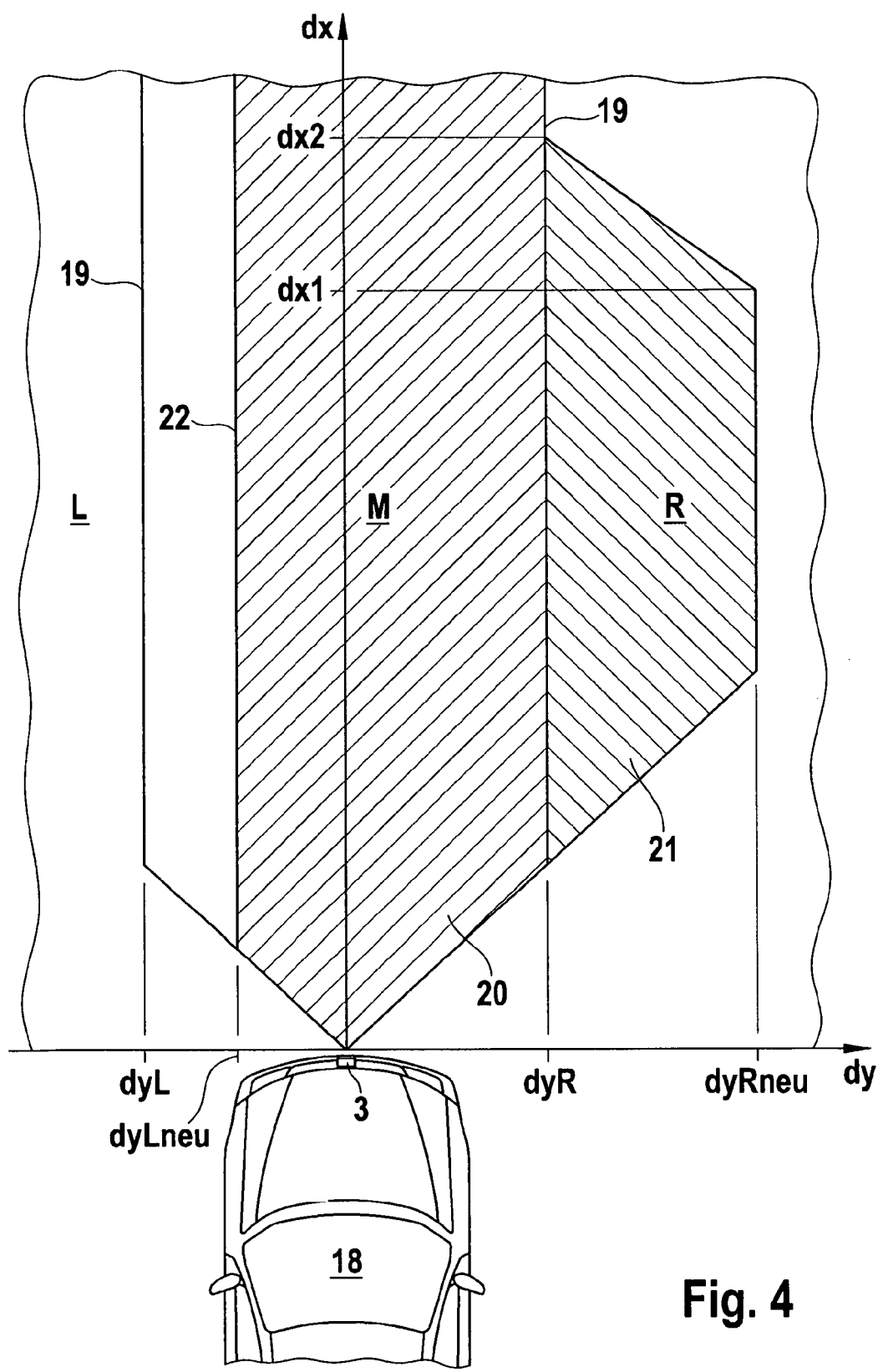
FIG. 4 is a schematic plan view of the detection region of the system according to the present invention, with an expanded evaluation region and a reduced evaluation region.

FIG. 4 depicts a further embodiment according to the present invention that improves the regulation behavior of adaptive separation controller 1 when a lane change has been recognized. Regulated vehicle 18 is once more visible, with object detection sensor 3, which monitors the region in front of the vehicle with regard to relevant objects, mounted on the front side. If what is recognized is, as in the present case, a lane change to the right into lane R, then not only are objects sensed within the region of lane M that is presently being traveled in, i.e. objects having a lateral offset of dyL<dy<dyR, but additionally also objects in the adjacent right lane that have a lateral offset of dyR<dy<dyRneu, this expanded evaluation region 21 being utilized for regulation only out to distance values dx=dx1 or dx=dx2. To ensure that vehicles that are located in the adjacent left lane L and may be driving too close to center lane M, or that are intending to make a lane change from lane L to lane M, are not taken into consideration in the determination of the reference speed of regulated vehicle 18 (since otherwise undesired controller reactions might occur that the driver may perceive as disruptive and in some cases as hazardous), left boundary 19 of evaluation region 20 can be no longer positioned at dy=dyL as previously, but can instead be shifted so that evaluation region 20 is delimited by boundary 22, resulting in a reduction of the lateral evaluation region 20 on the side opposite destination lane R. This is done by modifying evaluation boundary 19 on the left side toward quantitatively smaller dy values, so that the new lateral evaluation region boundary 22 that is opposite the destination lane side moves farther toward the center of lane M that is presently being traveled in.

Figure 5:
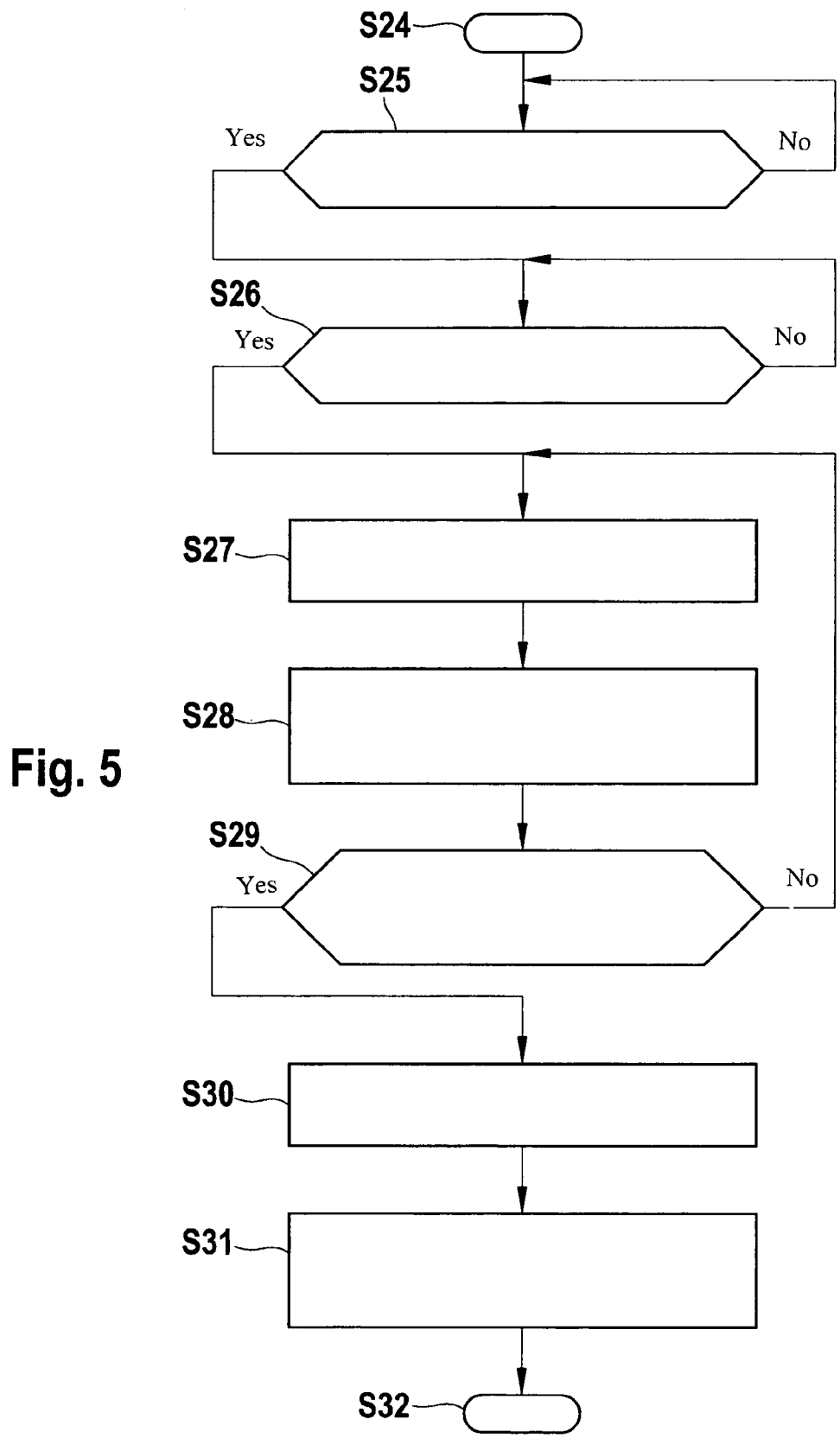
FIG. 5 is a flow chart of the method according to the present invention.

FIG. 5 depicts a flow chart of the method according to the present invention. The flow chart begins in step S24 at "Start"; step S24 can be followed by a step S32 "End" that can optionally be present. The following step S25 checks whether adaptive separation and speed controller 1 is active or deactivated. If ACC system 1 is switched off, S25 branches to No and execution waits for the activation of adaptive separation controller 1. If adaptive separation and speed controller 1 is active, step S25 then branches to Yes, and step S26 queries whether a lane change is imminent. Input signals 10 of lane change recognition device 9 are evaluated for this purpose. If this evaluation indicates that a lane change is not imminent, step S26 branches again to No and the method waits until a lane change has been recognized by lane change recognition device 9. Upon recognition of an intent to change lanes, the method branches to Yes in step S26, and in step S27 the evaluation region 20, which covers center lane M, is expanded to the destination lane in accordance with expanded evaluation region 21. Optionally, in the following step S28, provision can additionally or alternatively be made that evaluation region 20 on the side opposite the destination lane, i.e. the adjacent left lane L, is narrowed by decreasing left boundary 19 of evaluation region 20 from dy=dyL to dy=dyLneu. At this stage, for the duration of the lane change, what is processed is the modified evaluation region, in which vehicles in the destination lane are utilized to ascertain the reference speed of regulated vehicle 18, and any objects at the left edge of lane M that is presently being traveled in, i.e. between left boundaries 19 and 22 of the evaluation region, are no longer taken into consideration for ascertaining the reference speed of the regulated vehicle. If it is found in the next step S29 by way of lane change recognition device 9 that the lane change is not yet complete, or in the case in which a predetermined time period for the lane change has not yet elapsed, step S29 then branches to No and the modified evaluation region (in accordance with the preceding steps S27 and S28) is maintained. If step S29 recognizes that the lane change is complete or that the time period that was provided for the lane change has elapsed, step S29 then branches to Yes, and in the following step S30 the expanded evaluation region 21 is narrowed back down to the lane width presently being traveled in, so that objects having a lateral offset of dy>dyR are no longer evaluated for regulation purposes. If the optional or alternative step S28 was provided, then the optional or alternative step S31 is also necessary; this provides that the evaluation region narrowed to dy=dyLneu is reset back to the old dimension, by setting the left boundary of evaluation region 20 back to the lateral offset dy=dyL. Once the original evaluation region 20 has been reestablished in accordance with steps S30 and/or S31, and regulated vehicle 18 is once again traveling straight ahead with no intention to change lanes, the method according to the present invention is terminated at step S32 and can be resumed again, upon recognition of a new lane change, with step S26.

What is claimed is:

1. A method for regulating the speed of a controlled motor vehicle equipped with an object detection system, a computer processor, and a lane change recognition arrangement via which to determine whether a lane change by the controlled motor vehicle is imminent, the method comprising:
calculating, by the computer processor, a target speed for the controlled motor vehicle as a function of at least one preceding target vehicle in an evaluation region of the object detection system;
wherein:
when it is determined by the lane change recognition arrangement that the lane change is imminent, the evaluation region includes both at least a portion of a current lane of the controlled motor vehicle and at least a portion of an adjacent destination lane that is adjacent to the current lane in which the controlled motor vehicle is presently traveling, consideration, with respect to the adjacent destination lane, being given only to vehicles in a region of the adjacent destination lane within a threshold distance from the controlled motor vehicle defined by a boundary line drawn between a first point that is on a first boundary of the adjacent destination lane and a second point that is on a second boundary of the adjacent destination lane, the second point being farther forward of the controlled motor vehicle than the first point, the first boundary of the adjacent destination lane being farther from the current lane than the second boundary; and
when a lane change is not determined by the lane change recognition arrangement to be imminent, the evaluation region is limited to the at least the portion of the current lane of the controlled motor vehicle and not any of adjacent lanes of the controlled motor vehicle.

2. The method as recited in claim 1, wherein the evaluation region is substantially the lane in which the controlled motor vehicle is presently traveling.

3. The method as recited in claim 1, wherein the threshold distance region is predefined.

4. The method as recited in claim 1, wherein the threshold distance is variable.

5. The method as recited in claim 4, wherein the threshold distance region is dependent on the speed of the controlled motor vehicle.

6. The method as recited in claim 1, wherein the threshold distance is dependent on a relative speed of a detected vehicle in the adjacent destination lane with respect to the controlled motor vehicle.

7. The method as recited in claim 1, further comprising:
responsive to a determination that the lane change is imminent, reducing an initial evaluation region in a lateral region opposite the adjacent destination lane.

8. The method as recited in claim 7, wherein the reduction of the initial evaluation region in the lateral region opposite the adjacent destination lane occurs only within a zone extending along a direction of travel of the controlled motor vehicle, and wherein the inclusion of the at least a portion of an adjacent destination lane in the evaluation region occurs within the zone extending along the direction of travel.

9. The method as recited in claim 1, wherein the determination of whether a lane change is imminent includes at least one of (a) evaluation of a directional indicator signal, (b) evaluation of a present yaw rate, and (c) evaluation of a steering wheel angle signal.

10. The method as recited in claim 7, wherein at least one of (a) the inclusion of the at least a portion of an adjacent destination lane in the evaluation region and (b) the reduction of the initial evaluation region in the lateral region opposite the adjacent destination lane is canceled after a predetermined time span has elapsed.

11. The method as recited in claim 7, wherein at least one of (a) the inclusion of the at least a portion of an adjacent destination lane in the evaluation region and (b) the reduction of the initial evaluation region in the lateral region opposite the adjacent destination lane is canceled after a determination of the end of the lane change operation, wherein the determination of the end of the lane change operation includes at least one of (a) evaluation of a directional indicator signal, (b) evaluation of a present yaw rate, and (c) evaluation of a steering wheel angle signal.

12. An apparatus for regulating the speed of a controlled motor vehicle, comprising:
an object detection system;
a computer processor configured to calculate a target speed for the controlled motor vehicle as a function of at least one preceding target vehicle in an evaluation region of the object detection system; and
a lane change recognition unit configured to determine whether a lane change by the controlled motor vehicle is imminent;
wherein:
when it is determined by the lane change recognition unit that the lane change is imminent, the evaluation region includes both at least a portion of a current lane of the controlled motor vehicle and at least a portion of an adjacent destination lane that is adjacent to the current lane in which the controlled motor vehicle is presently traveling, consideration, with respect to the adjacent destination lane, being given only to vehicles in a region of the adjacent destination lane within a threshold distance from the controlled motor vehicle defined by a boundary line drawn between a first point that is on a first boundary of the adjacent destination lane and a second point that is on a second boundary of the adjacent destination lane, the second point being farther forward of the controlled motor vehicle than the first point, the first boundary of the adjacent destination lane being farther from the current lane than the second boundary; and
when a lane change is not determined by the lane change recognition unit to be imminent, the evaluation region is limited to the at least the portion of the current lane of the controlled motor vehicle and not any of adjacent lanes of the controlled motor vehicle.

13. The apparatus as recited in claim 12, wherein the computer processor is configured to, responsive to a determination that the lane change is imminent, reduce an initial evaluation region in a lateral region opposite the adjacent destination lane.

14. A method for regulating the speed of a controlled motor vehicle equipped with an object detection system, a computer processor, and a lane change recognition arrangement via which to determine whether a lane change by the controlled motor vehicle is imminent, the method comprising:

calculating, by the computer processor, a target speed for the controlled motor vehicle as a function of at least one preceding target vehicle in an evaluation region of the object detection system;

wherein:

when it is determined by the lane change recognition arrangement that the lane change is imminent, the evaluation region includes both at least a portion of a current lane of the controlled motor vehicle and at least a portion of an adjacent destination lane that is adjacent to the current lane in which the controlled motor vehicle is presently traveling, consideration, with respect to the adjacent destination lane, being given only to vehicles in a region of the adjacent destination lane within less than a threshold distance from the controlled motor vehicle defined by at least two lines that are each perpendicular to the current lane, are at different respective predefined distances forward of the controlled motor vehicle, and that define components of the threshold distance, the components being at different lateral distances from the controlled motor vehicle; and when a lane change is not determined by the lane change recognition arrangement to be imminent, the evaluation region is limited to the at least the portion of the current lane of the controlled motor vehicle and not any of adjacent lanes of the controlled motor vehicle.

15. The method as recited in claim 14, further comprising: responsive to a determination that the lane change is imminent, reducing an initial evaluation region in a lateral region opposite the adjacent destination lane.

* * * * *